Nov. 16, 1926.                                                          1,607,026
                           F. VON MADALER
         COMBINED PICTURE AND SOUND RECORD AND METHOD OF PRODUCING SAME
                           Filed June 1, 1923
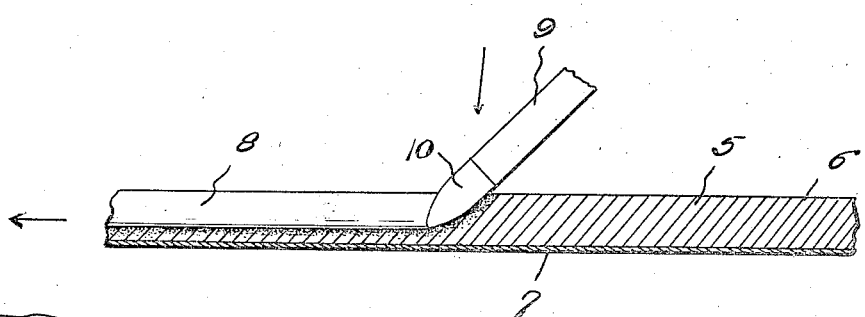
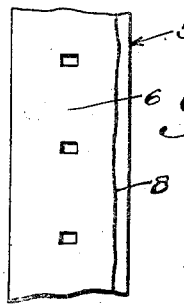
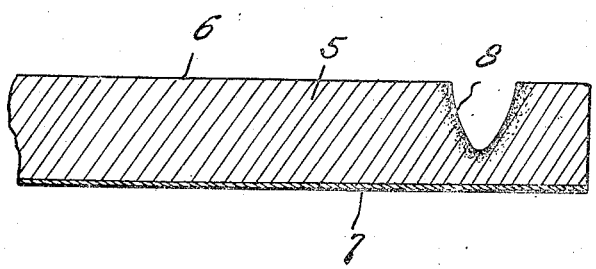
Witnesses:                                    Ferdinand Von Madaler,
                                                      Inventor
                                              By
                                                      Attorney Patented Nov. 16, 1926.

1,607,026

UNITED STATES PATENT OFFICE.

FERDINAND VON MADALER, OF HAMPTON BAYS, NEW YORK.

COMBINED PICTURE AND SOUND RECORD AND METHOD OF PRODUCING SAME.

Application filed June 1, 1923. Serial No. 642,766.

It is a well appreciated fact that numerous attempts have been made to produce a motion picture, with which a talking machine could be synchronized to thus produce talking pictures.

These attempts have not been proven commercially practical, incident to the fact that it has been usual to endeavor to produce the result desired by the use of a projecting apparatus and talking machine, together with mechanism which synchronizes the movement of these two machines. Thus assuming that we have one hundred feet of film, and a corresponding length of tone groove; incident to being used, the film is broken and the ends of the same must be joined, thus after the film has been projected, a certain number of times we may find that there is about ninety feet of the same, but the tone groove of the record has remained constant and consequently no apparatus is capable of synchronizing the sound reproduction with the picture projection, and the latter is usually in advance of the former, whereby an extremely undesirable result is achieved.

In an endeavor to overcome this difficulty, it has been suggested that the tone reproduction be embodied in one of the film surfaces, so that upon the latter being shortened, the former will also be correspondingly shortened, and thus the sound reproduction and picture projection will be obviously synchronized. However, endeavors of this nature have not met with success, due, first, to the difficulty in forming a tone groove in a film, and secondly, where it was sought to reproduce tones by embodying light tracings in the body of the film to record the tone wave effect, and to consequently reproduce these tracings by the source of illumination in association with a selenium cell, the effects have been discouraging, due to the fact that the results have necessarily had to be subjected to a number of steps of amplification, and any imperfections in the body of the film are amplified and multiplied, so that in most instances, the entire effect of the film is destroyed.

I am aware that attempts have been made to impress a sound wave upon a film by softening the film with a fluid composition, and then impressing or engraving the sound record upon the film while in a soft state. However, these attempts have not succeeded, due to the fact, that the walls of the sound groove of the celluloid film will contract as the film becomes hard, thereby completely distorting the sound waves.

Other attempts have been made to produce this result by heating the stylus of the recording apparatus, preliminary to the engagement of the same with the film. It is practically an impossibility to maintain a stylus at a uniform temperature, and it is thereby obvious that proper results cannot be procured by this method of applying a sound record to a film.

After very careful and exhaustive experiments, I have discovered that a perfect sound record can be produced upon a picture film by impressing into the celluloid surface of the film, a stylus of a reproducing machine, and this while the stylus is in a cold state, and the film in its natural state, for thereby producing sound waves.

I have also discovered that the pure celluloid, which is contained in all moving picture films is one of the most suitable materials on which to impress sound waves, in view of the fact that the grain of the material is extraordinarily fine, thereby permitting the reproduction of sound without any material scratching, which is a great disadvantage of the present type of sound records.

Having the above in mind, it is therefore the primary object of this invention to provide a combined picture and sound record together with a method whereby sound waves may be applied to the celluloid surface of a moving picture film, and the film used in conjunction with projecting and reproducing mechanism a great number of times without the reproducing qualities being affected to the slightest extent.

With the above and other objects in view, the present invention has reference to a method whereby a sound wave may be impressed upon a picture film in the simplest and most efficient manner possible.

Reference is had to the attached drawing as illustrating the practical embodiment of my invention, and in the drawing, it will be seen that:

Figure 1 is a fragmentary section on a substantially enlarged scale of the picture film, the same being in the act of having a sound groove impressed upon its celluloid side, through the medium of a stylus of a sound recording machine.

Figure 2 is a detail transverse cross section of the film on the same enlarged scale as Fig. 1.

Figure 3 is a plan view of a portion of a film strip showing the position of the record groove.

Having particular reference to this drawing, the film strip 5 that is similar in all respects to the moving picture film now universally employed in conjunction with picture projecting machines is adapted to have impressed or engraved upon its celluloid surface 6, in contra-distinction to its gelatin or emulsion surface 7 and adjacent one or both sides thereof, a sound groove 8 through the medium of a stylus 9 of a desirable sound box that constitutes an essential element in all sound recording machines.

In carrying out my method, the stylus 9 is positioned upon the celluloid surface 6 of the film 5, and preferably adjacent one edge thereof, it being understood in this connection, that both the stylus and film are in their natural cold state. This stylus is positioned at an angle of approximately forty-five degrees with respect to the longitudinal axis of the film and pressure is applied to this stylus in the direction of the arrow in Figure 1, that is, in a direction vertically downwardly. The amount of pressure to which the stylus is subjected is such as to embed the point of the same into the celluloid material a distance of approximately two-thirds the thickness of the film. In this connection, it is of course well known that the emulsion or gelatin surface of the film is of paper or lesser thickness, thereby precluding any liability of the stylus point engaging the gelatin or emulsion surface of the film.

The film is moved in the direction of the arrow in Figure 1 at a speed of one or more feet per second, and it is of course necessary, that the picture be taken simultaneously with the recording of the sounds for obtaining the proper synchronization. By positioning the stylus 9 in the position shown and described with relation to the film, the celluloid material beneath the stylus point is compressed in contra-distinction to being scraped from the film, thereby substantially hardening the walls of the sound groove, which is a desired requisite in lengthening the life of the film.

I have discovered that even better results may be procured by employing a stylus, with a highly polished diamond point, as indicated at 10 and in this connection, it might be well to note that equal results may be procured by impressing into the celluloid material of the film a sound groove of either the "hill and dale" or "zig-zag" type.

I have shown and described that this method includes the impressing of a sound groove upon the celluloid surface of the film, but it is to be understood that this groove may be impressed upon the gelatin or emulsion side, it of course being necessary in this instance, that the edge or edges of the gelatin surface be relieved of its gelatin or emulsion coating.

Having thus described my invention, what I claim as new, and desire to secure by Letters-Patent, is:

1. A method of making a sound record on a moving picture celluloid film strip in its natural state and without additional preparatory treatment which comprises compressing the sound record groove into the material in a cold state by impressing therein to a rearwardly and downwardly extending stylus, provided with a rounded diamond end, said stylus forming part of a sound recording apparatus operated by the sound responsive means thereof during travel of the strip, whereby a smooth unroughened groove is produced with a bottom and side walls of condensed and hardened surfaces, and with no ridge beside the groove above the film surface.

2. A method of making a sound record on a moving picture celluloid film strip in its natural state and without additional preparatory treatment which comprises compressing the sound record groove into the material of the strip in a cold state by impressing thereinto a substantially ogival-shaped stylus provided with a diamond end piece inclined at an acute angle to the film strip, said stylus forming part of a sound recording apparatus operated by the sound responsive means of said apparatus during travel of the strip, whereby a smooth unroughened groove is produced with a bottom and side walls of condensed and hardened surfaces and with no ridge beside the groove above the film surface.

3. As an article of manufacture, a record comprising a moving picture celluloid film strip in its natural state having a continuous longitudinal portion of substantially ogival-shape in cross-section impressed with a stylus having a forming end provided with a diamond of substantially ogival-shape, and the same shape as said section, said stylus being positioned at right angles to the transverse plane of the film strip and at an acute angle to the longitudinal plane of the film strip to form a groove having a smooth condensed and hardened side and bottom walls, said groove having the identical shape and size as the continuous longitudinal portion before its impression into the remaining portion of the strip by the stylus.

4. As an article of manufacture, a record comprising a moving picture celluloid film strip in its natural state having one side provided with an emulsion surface, and on the opposite side of said strip having a continuous longitudinal portion thereof compressed with a stylus operated by a sound recording apparatus, said stylus having a diamond point of substantially ogival-shape and arranged at right angles to the transverse plane of the film strip and at acute angles to the longitudinal plane to form a sound record groove of substantially ogival-shape in cross-section corresponding to said stylus, the material from the groove section being compressed substantially laterally into the body of the strip in condensed form adjacent the groove to provide a smooth hardened surface in the bottom and side walls thereof, the section of said film strip remaining uniform throughout and contiguous to said groove, and with no ridge formed beside the groove above the film surface.

In testimony whereof I affix my signature.

FERDINAND VON MADALER.